Aug. 16, 1949.　　　　L. A. WERTH　　　　2,479,145
CUTTER FOR PRODUCING RADISH ROSETTES
Filed Aug. 13, 1945

INVENTOR.
Lawrence A. Werth
BY
Attorneys

Patented Aug. 16, 1949

2,479,145

UNITED STATES PATENT OFFICE 2,479,145

CUTTER FOR PRODUCING RADISH ROSETTES

Lawrence A. Werth, Dearborn, Mich.

Application August 13, 1945, Serial No. 610,424

2 Claims. (Cl. 146—203)

The present invention relates to vegetable cutters and specifically to devices for the partial peeling or "rosing" of radishes.

Among the objects of the invention is a simple, economical device for the purpose indicated which shall be easy to manufacture and simple and safe to use.

Other objects and advantages will be apparent to those skilled in the art upon reference to the following description and the accompanying drawings in which Fig. 1 is a side elevation of the "roser."

As indicated, the device consists of a handle portion 10 provided with legs 11 spaced well apart. This is preferably made integral and may be of molded plastic, turned wood or other suitable material.

The handle portion 10 when the legs 11 are joined is formed to present a flat under surface 10A and a suitable central bore extends vertically through the handle to open to such surface.

Figure 3:
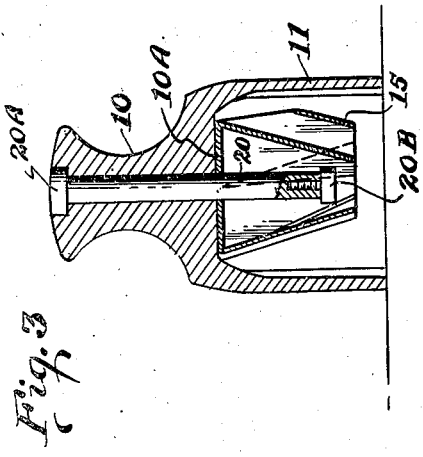
Fig. 3 is a section on line 3—3 of Fig. 2.
Figure 4:
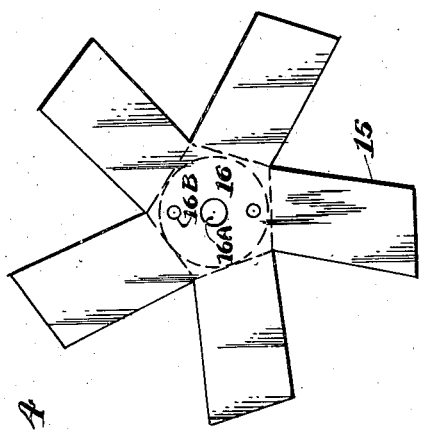
Fig. 4 is a plan view of the knife blank.
Figure 2:
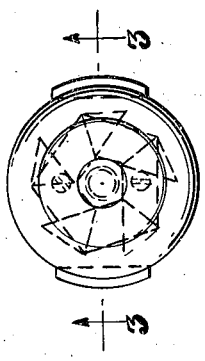
Fig. 2 is a top plan view.
Figure 1:
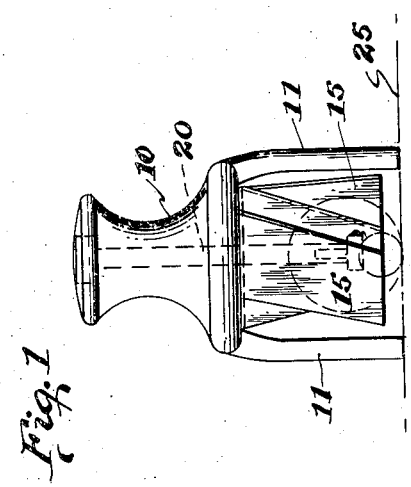

Fixed to the surface 10A is a knife structure consisting of a plurality of flat blades 15 attached to a common root plate 16 provided with a central opening 16A and preferably formed from a blank of the form shown in Fig. 4. With such a blank, the several blades 15, suitably sharpened on their ends, are bent down and somewhat inwardly, so that they partially overlie each other and have each a free edge extending outwardly of the group of blades. Suitable openings 16B are provided for screws or brads or other fastening means, whereby to attach the blade structure. While five blades are shown, it is obvious that a greater or less number may be used, if found desirable. Slidably carried in the bore in handle 10 and opening 16A extends a rod 20 preferably provided with a head 20A, which may fit in a suitable countersink in the top of the handle if desired. The rod 20 should be of sufficient length to extend downwardly to about the level of the lower edges of blades 15 and is preferably provided with a footpiece 20B.

In using the device, the radish is placed on a suitable surface 25 and the blades 15 thrust down to slice the rind and a portion of the radish, turning the sections outwardly. At the same time, the rod 20 is thrust upwardly and may subsequently be operated downwardly to eject the radish from the knives 15.

Now having described the invention and the preferred embodiment thereof, it is to be understood that said invention is to be limited, not to the specific details herein set forth, but only by the scope of the claims which follow.

I claim:

1. In combination with a handle having spaced legs and provided with a flat under surface therebetween, a knife structure consisting of a flat portion attached to said flat surface and having at the periphery of said portion a plurality of flat depending end sharpened knives integral therewith, said depending knives being of substantially uniform width from top to bottom and being inclined inwardly whereby to provide overlapping of the side edges thereof.

2. A vegetable cutter consisting of a handle member provided with legs, a knife structure carried upon the underside of said handle between said legs and of less length than said legs, said knife structure consisting of a plurality of end sharpened plates in polygonal arrangement with the plates overlapping, and a slidable ejector extending through said handle and into the space within the knife group.

LAWRENCE A. WERTH.

REFERENCES CITED

The following references are of record in the file of this patent:

UNITED STATES PATENTS

| Number | Name | Date |
| --- | --- | --- |
| 161,359 | Siler | Mar. 30, 1875 |
| 210,503 | Coulter | Dec. 3, 1878 |
| 288,044 | Foster | Nov. 6, 1883 |
| 573,432 | Megson | Dec. 15, 1896 |
| 921,917 | Troxell | May 18, 1909 |
| 1,070,854 | Stoler et al. | Aug. 19, 1913 |
| 1,519,752 | Bannister | Dec. 16, 1924 |
| 1,835,720 | Pease | Dec. 8, 1931 |
| 1,943,113 | Daum | Jan. 9, 1934 |
| 2,140,010 | Hanel | Dec. 13, 1938 |
| 2,322,243 | Larson et al. | June 22, 1943 |
| 2,331,604 | Gamache et al. | Oct. 12, 1943 |

FOREIGN PATENTS

| Number | Country | Date |
| --- | --- | --- |
| 370,240 | Germany | Mar. 1, 1923 |